United States Patent [19]

Arnaud

[11] Patent Number: 5,006,243
[45] Date of Patent: Apr. 9, 1991

[54] FILTER BAG SECURING RING
[75] Inventor: Johnny Arnaud, Houston, Tex.
[73] Assignee: Hydrotreat, Inc., Pasadena, Tex.
[21] Appl. No.: 399,356
[22] Filed: Aug. 24, 1989

Related U.S. Application Data

[63] Continuation of Ser. No. 110,976, Oct. 20, 1987, abandoned.
[51] Int. Cl.$^5$ .............................................. B01D 29/27
[52] U.S. Cl. ..................................... 210/232; 210/448; 210/452; 55/373; 55/376; 55/379; 277/23; 277/205
[58] Field of Search ............... 210/445, 448, 450, 451, 210/452, 232; 55/373, 376, 377, 378, 379; 277/23, 205, 1

[56] References Cited

U.S. PATENT DOCUMENTS

| | | | |
|---|---|---|---|
| 3,204,392 | 9/1965 | Schwab | 210/448 |
| 3,206,216 | 9/1965 | Crook | 277/23 |
| 3,640,392 | 2/1972 | Smith et al. | 55/373 |
| 3,747,305 | 7/1973 | O'Dell et al. | 55/341 |
| 3,771,664 | 11/1973 | Schrink et al. | 55/373 |
| 3,774,769 | 11/1973 | Smith | 55/373 |
| 3,834,134 | 9/1974 | McAllister | 55/378 |
| 3,937,621 | 2/1976 | Gravley | 55/377 |
| 3,942,962 | 3/1976 | Duyckinck | 55/302 |
| 4,003,727 | 1/1977 | O'Dell | 55/377 |
| 4,015,961 | 4/1977 | Howard et al. | 55/378 |
| 4,056,374 | 11/1977 | Hixenbaugh | 55/377 |
| 4,157,964 | 6/1979 | Rishel | 55/373 |
| 4,244,718 | 1/1981 | Noddin | 55/377 |
| 4,303,425 | 12/1981 | Cox, Jr. | 55/378 |
| 4,490,253 | 12/1984 | Tafara | 55/378 |

Primary Examiner—Richard V. Fisher
Assistant Examiner—Wanda L. Millard
Attorney, Agent, or Firm—Arnold, White & Durkee

[57] ABSTRACT

An improved filter apparatus including a securing mechanism to hold a flexible filter media such as a filter bag in position. The securing mechanism includes a receiving member having an internal bore adapted to receive a portion of the filter media. A retaining ring having an externally projecting contact ridge adapted to make essentially line contact around the inner periphery of the receiving member is utilized to secure the bag within the receiving member. The filter cloth may either be inserted between the securing ring and the inner surface of the receiving member, or a slightly larger securing ring may be utilized to seat on top of a conventional filter bag retaining ring to secure the ring and the bag in position.

9 Claims, 4 Drawing Sheets

FILTER BAG SECURING RING

This application is a continuation of application Ser. No. 110,976, filed Oct. 20, 1987, now abandoned.

BACKGROUND OF THE INVENTION

The present invention relates generally to improved filter apparatus and more specifically relates to methods and apparatus for sealing flexible filter media such as filter bags in a filter apparatus.

Filter apparatus using cloth or fiber filter media are well-known in the filter industry. In one common type of filter, the filter media is formed into a bag and the filter apparatus is known as a bag filter. In a typical bag filter, a fluid housing having a fluid inlet and a fluid outlet encloses the filter bag and a filter basket utilized to support the bag. The filter basket may be of one of several constructions, including perforated metal forms, wire mesh screens, or simulated mesh screens. The mouth of the filter bag is held at a fixed location proximate the top of the basket by various mechanisms, such as rings formed of springs or rings having a circular cross-section formed in either metal or plastic.

Filter bags may be of a variety of materials, including cotton, polyester, spun fiberglass, nylon, polypropylene, polyethylene, and Teflon ®, etc. As a result of their woven construction, filter bags have a fabric thickness which may be in the range of approximately 0.003 inches to 0.160 inches. Also, because of their woven construction and possible thickness, filter bags may exhibit a significant compressibility.

A problem with conventional bag filters is that there is often substantial turbulence in the influent as it enters the mouth of the bag. With conventional securing mechanisms this turbulence has been found to cause deflection of the bag sufficient to allow influent to by-pass the bag, and in some cases to cause the retaining ring to leave its seat and to allow the filter bag to collapse within the basket. Such occurrences are critical because any fluid which leaks past the mouth of the bag to the exterior of the bag will not be filtered through the filter media. Because bag filters are often utilized to filter fluids to remove particles as small as three microns, any deficiency in the seal may lead to a substantial reduction in the efficiency of the filtering process. If the bag comes free from the upper portion of the basket, there is a total breakdown of the seal and a failure of the filtering capability of the filter. Accordingly, a critical area in a bag filter is the point at which the mouth of the bag is secured to the top portion of the basket and a seal is formed to prevent the flow of fluid around the bag.

Accordingly, the present invention provides a filter including a new method and apparatus for sealing a flexible filter media such as a filter bag which utilizes a securing ring providing generally line contact with a receiving member to significantly improve the retention of the securing ring within the receiving member and to therefore cause improved securing of the filter bag.

SUMMARY OF THE INVENTION

A filter apparatus in accordance with the present invention includes a securing mechanism for securing a portion of the filter bag to the filter basket. The securing mechanism includes a receiving member which includes an inner surface for receiving a portion of the filter bag. The receiving member preferably includes an inwardly projecting ledge which provides a resting surface for the securing ring. The securing ring utilized in accordance with the present invention includes an outer contact surface with a projecting ridge which is adapted to apply force against the inner seating surface of the receiving member, generally along a line contact point, either directly or through the filter bag. In a particularly preferred embodiment, the exterior contact surface will have the general shape of a broad wedge, or shallow-V, as may be formed with two converging faces which meet to form the contact ridge. A securing ring in accordance with the present invention may be utilized either to secure the filter bag by applying pressure through the bag upon the receiving member; or, may be utilized to retain a conventional bag and retaining ring in position against a retaining ledge, by exerting force directly upon the inner surface of the receiving member.

DETAILED DESCRIPTION OF PREFERRED EMBODIMENTS

Figure 1:
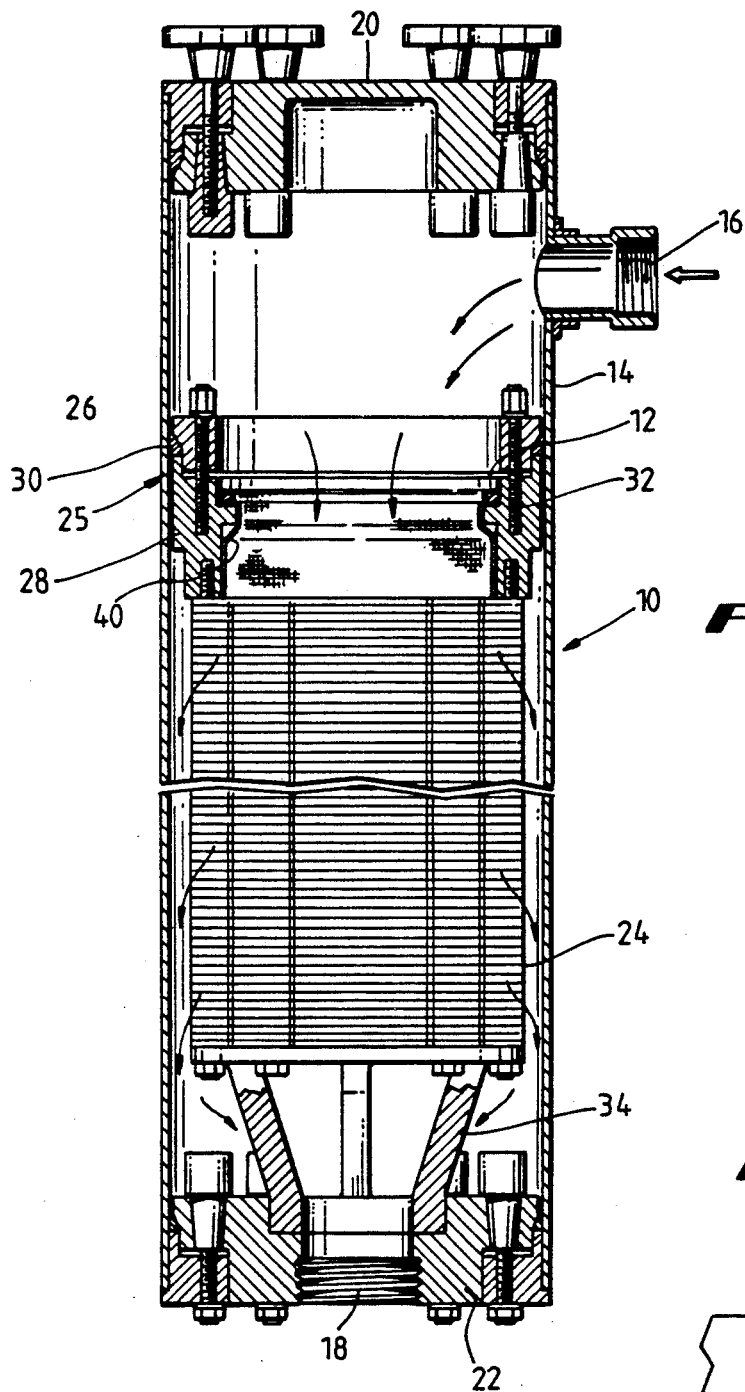
FIG. 1 depicts a filter apparatus including a filter bag and a sealing mechanism, in accordance with the present invention.
Figure 2B:
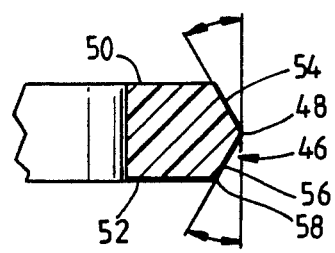
FIGS. 2A-B depict the sealing apparatus of FIG. 1 in vertical section and in greater detail.
Figure 2A:
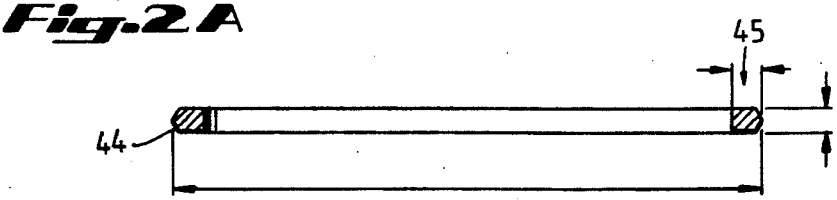
Figure 3A:
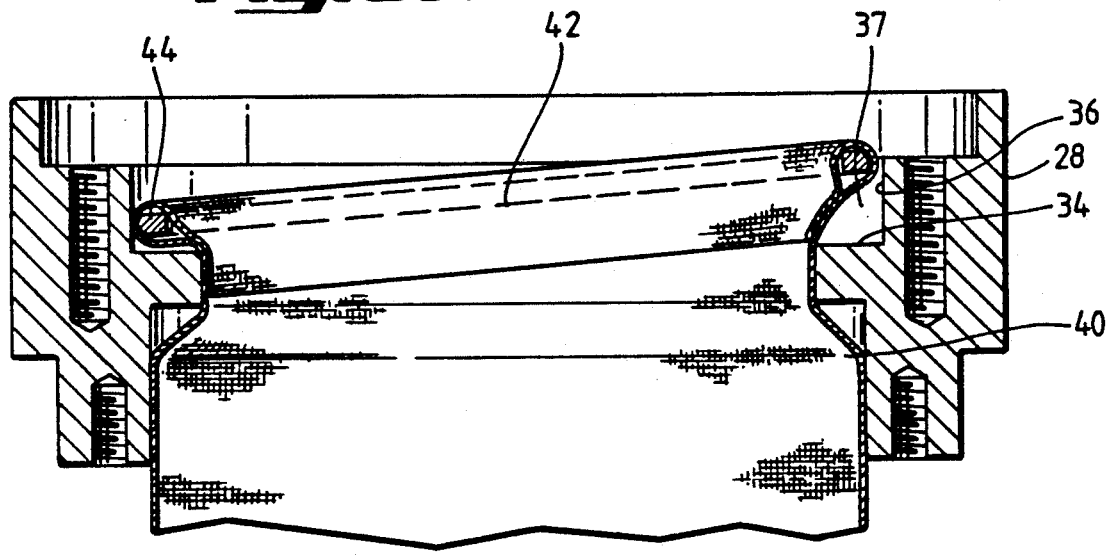
FIGS. 3A-C depict the sealing apparatus for FIG. 1 in partially installed position (3A), in operating position (3B), and in operating position in greater detail (3C), illustrated invertical section.
Figure 3C:
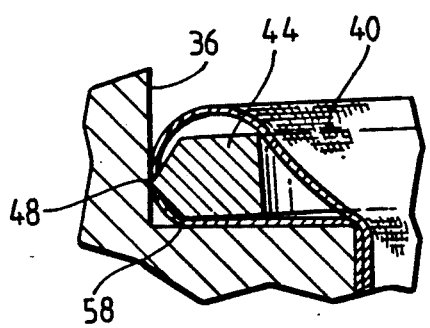
Figure 3B:
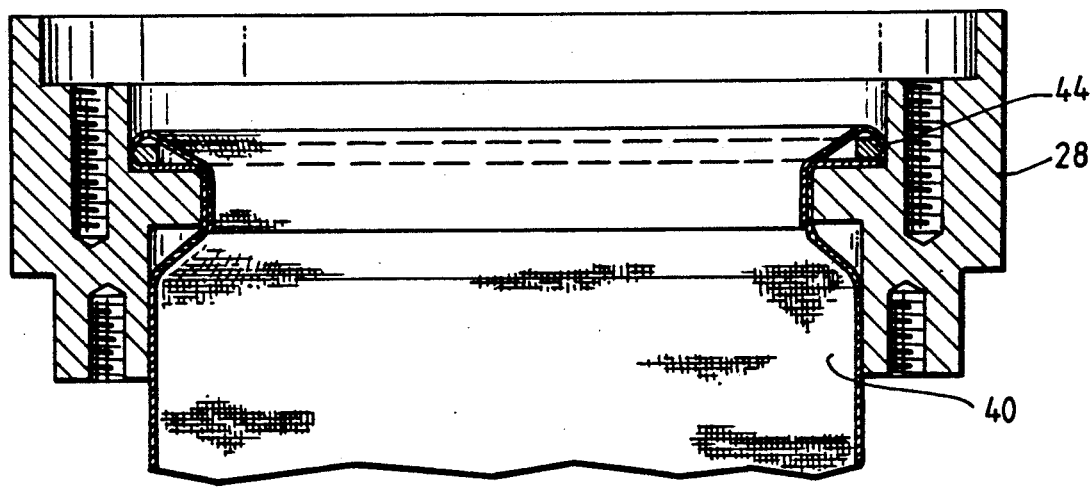

Referring to the drawings in more detail, and particularly to FIGS. 1 and 2A-B and 3A-B, there is depicted in FIG. 1 a filter apparatus 10 including a sealing apparatus 12 in accordance with the present invention. FIGS. 2A-B depict the securing ring of sealing apparatus 12 in greater detail and in vertical section. FIGS. 3A-C depict the sealing apparatus of FIG. 1 during and after installation of the securing ring.

Filter apparatus 10 includes a housing 14 having a fluid inlet 16 and a fluid outlet 18. Each end of housing 14 is sealed by an end seal 20 and 22, as described in copending application Ser. No. 879,519, filed June 27, 1986, now abandoned and assigned to Hydrotreat, Inc. The specification of application Ser. No. 879,519 is incorporated herein by reference to illustrate the state of the art. Contained within housing 14 is a structural mesh filter basket 24 constructed in accordance with U.S. Pat. No. 4,517,089, issued May 14, 1985 and assigned to Hydrotreat, Inc. The disclosure of U.S. Pat. No. 4,517,089 is incorporated herein by reference for all purposes.

Briefly, structural mesh filter basket 24 includes a sealing section, indicated generally at 25 which includes a wedge block 26 and a ring body 28. A flexible annular seal 30 having a tapered surface is held against a tapering periphery of wedge block 26. A plurality of threaded members 32 extend through wedge block 26 and engage ring body 28. As mounting screws 32 are tightened, ring body 28 is drawn against annular seal 30 causing it to be urged outwardly into increasingly secure sealing relation with the interior of housing 14. At its lower end, structural mesh basket 24 includes a bottom plate 34 which engages lower end seal 22 to secure the filter basket firmly in position within housing 14.

Ring body 28 serves as a receiving member for filter bag 40. Ring body 28 includes a seating surface 36 which defines a curvilinear, and, preferably cylindrical, aperture 37. Ring body 28 also preferably includes a seating ledge 38 which projects radially inwardly from seating surface 36. Seating ledge 38 supports mouth 42 of bag 40.

Seating surface 36 and ledge 38 are conventionally formed surfaces as may be utilized with a conventional filter bag having a retaining ring of conventional circular cross-section. However, a filter in accordance with the present invention utilizes a sealing apparatus including a securing ring 44 as depicted in FIGS. 2A-B. Securing ring 44 includes a contact surface 46 on its external periphery which includes a contact ridge 48. Contact ridge 48 is preferably located between top and bottom surfaces 50 and 52, respectively, of securing ring 40. Most preferably, contact ridge 48 is generally centrally located between top and bottom surfaces 50 and 52. Contact 48 is preferably formed by two converging faces 54 and 56 which each lie at an acute angle to a plane perpendicular to the radial axis of securing ring 44. This angle of each face 54 and 56 relative to such plane is preferably between 15° and 45°, and is most preferably between 25° and 35°. An angle of 30° has been found to perform exceptionally well. In one preferred embodiment, top and bottom surfaces 50 and 52 of securing ring 40 will each be generally flat and will lie in generally parallel relation to one another. Accordingly, as can be seen in FIG. 3, the convergence of face 56 on contact surface 46 and bottom surface 52 forms a second ridge 58. Securing ring 44 is preferably constructed of a somewhat flexible material. Polypropylene has been found to be a satisfactory material for securing ring 46 for many applications. However, other materials which will allow some flexibility in the securing ring may be utilized. For example, securing rings may also be formed of Teflon ® or of appropriate metals. In some applications it may be desirable to match the material of the ring to the material of which the filter bag is constructed.

For any particular application, the size of the securing ring is selected such that when the securing ring is inserted adjacent seating surface 36 of the receiving member, with the bag interposed between securing ring 44 and seating surface 36, securing ring 44 will be slightly compressed. This maximum compression is achieved when securing ring 44 is in coaxial relation with seating surface 36. Preferably, at such time securing ring 44 will also be parallel to seating ledge 38. In sizing securing ring 44, allowance must be made for the compressibility of the filter bag. For example, where a retaining ring is to be utilized with filter bag having a nominal thickness of 0.125 inches, and the receiving member has a diameter of approximately 5.188 inches, a retaining ring having an outside diameter of 5.120 inches may typically be utilized.

The thickness of securing ring 44 may also be adapted for specific applications. An important advantage of the present invention is that for an application as set forth above, even a ring of as little as 0.125 inches in cross-sectional width (from interior diameter to outside diameter of ridge 48) has been found to perform satisfactorily. However, in circumstances where it may be desirable to have a stiffer and stronger ring to provide maximum securing and sealing force, a securing ring having a greater cross-sectional width 45, for example, 0.25 inches, may be utilized. Additionally, the cross-sectional height of the ring may be increased.

As discussed earlier herein, during a filtering operation, when a conventional retaining ring having a generally circular cross-section is utilized, turbulence may tend to dislodge the ring from its seat. The circular cross-section, in conjunction with a bag of a compressible thickness, serves to provide a cushioned sealing area which, it is believed, allows the bag to slip relative to the ring even under high compression. Additionally, the circular cross-section apparently serves to allow the retaining ring to move relatively freely relative to the receiving member.

In contrast, when the present invention is utilized to secure a filter bag, localized force to retain the bag is applied to the seating surface 36 of the receiving member by contact ridge 48. Contact ridge 48 provides essentially line contact application of the compressive force on securing ring 44 upon the receiving member seating surface. When force is exerted upon the filter bag, such as by turbulence, because of the fixed relation between the filter bag and the securing ring achieved with the present invention any substantial force will cause a slight deformation of securing ring 44 which urges ridge 48 into even stronger sealing engagement with receiving member seating surface 46. Additionally, experience has shown that such force on the filter bag does not tend to dislodge securing ring 44 from its position relative to seating surface 36 and ledge 38. The filter bag is therefore secured in position and a seal is formed between the filter bag and the receiving member which prevents the flow of fluid past the bag. At the same time, however, the securing ring allows an operator to quickly and easily remove the filter bag from the top of the filter.

While not wishing to be bound by theory, it is believed that deflection of securing ring 44 by forces on the filter bag may cause slight deflection of securing ring 44 causing another point of line contact application of force along ridge 58, as depicted in FIG. 3C. Deflection of this type would provide two lines of contact force on the receiving member, thereby further preventing slippage of the filter bag relative to securing ring 44.

Figure 4:
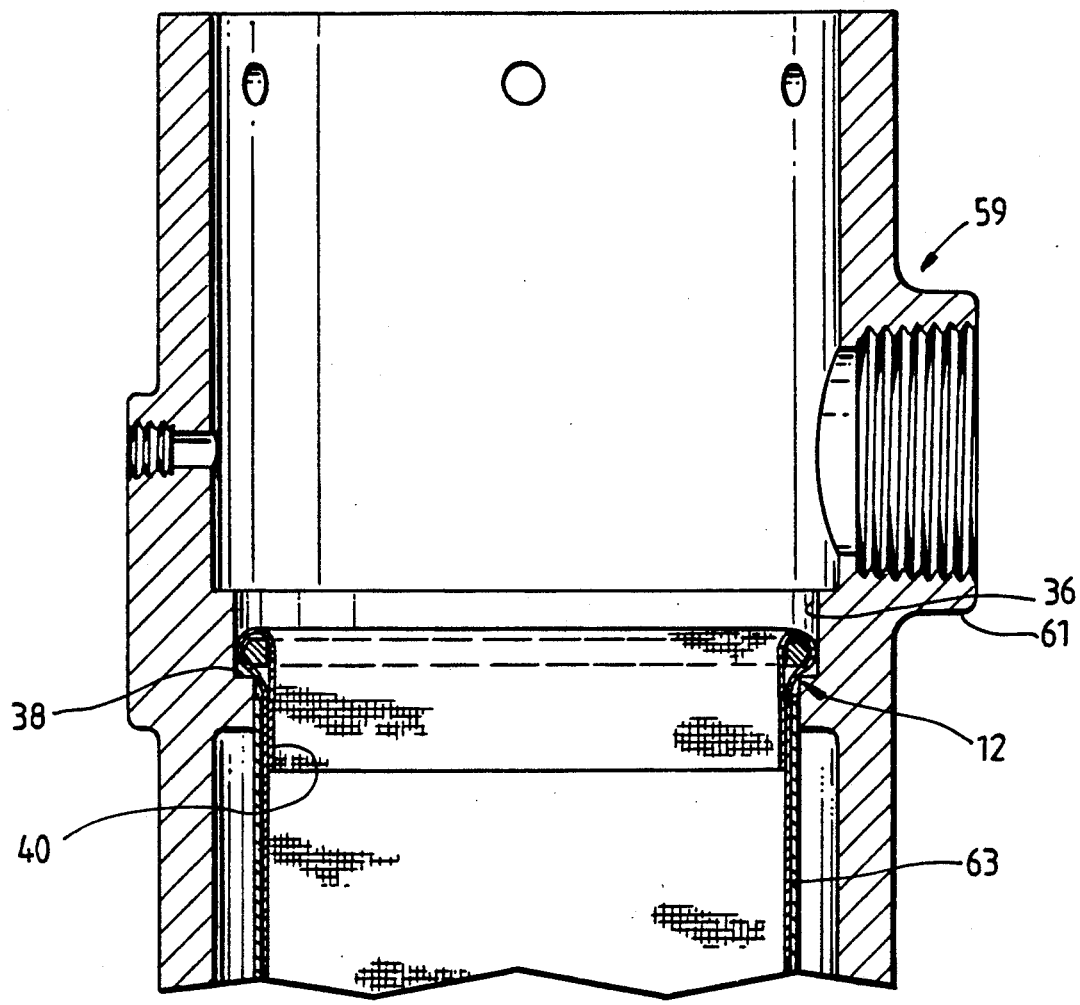
FIG. 4 depicts an alternative embodiment of a filter including a securing mechanism in accordance with the present invention, illustrated in vertical section.

Referring now to FIG. 4, therein is illustrated an upper portion of an alternative embodiment of the filter apparatus 59 including a housing 61 which also serves as the receiving member for securing apparatus 12. Housing 61 includes a seating surface 36 and a seating ledge 38. A filter basket 63 is retained within housing 61 beneath seating ledge 38. Securing ring 44 cooperates with filter bag 40 and with receiving section 64 in the same manner as securing ring 44 cooperated with the receiving member of the embodiment of FIGS. 1–3.

Figure 5:
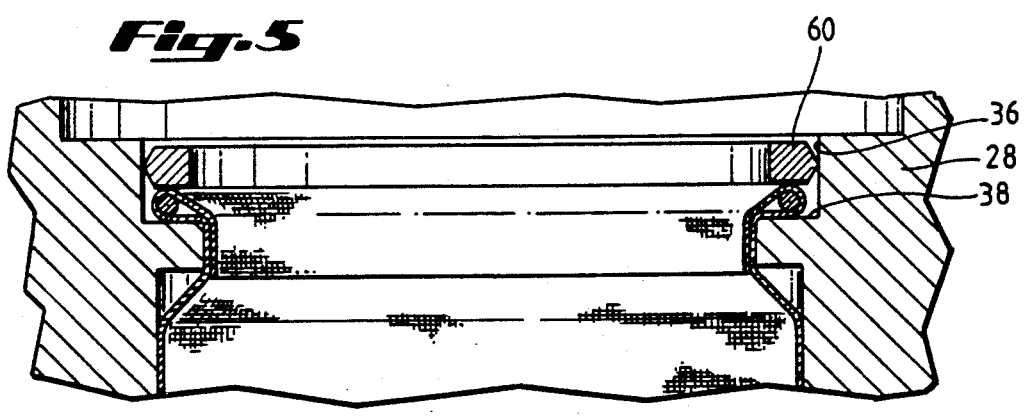
FIG. 5 depicts an alternative embodiment of a securing mechanism in accordance with the present invention, illustrated in vertical section.

Referring now to FIG. 5, another aspect of the present invention is that a securing ring 60 having a conformity generally as depicted in FIG. 2A may also be utilized as a securing member with an existing filter bag 62, having a self-contained conventional retaining ring. A separate securing ring 60 having a conformity generally as depicted in FIG. 2A and described in the associated text may be utilized as a supplemental seal to maintain the conventional retaining ring in position. In this application, securing ring 60 will be sized to cause compression of securing ring 60 when the securing ring is installed adjacent seating surface 36 of the receiving member. Additionally, the width of securing ring 60 will preferably be established by making the interior diameter of securing ring 60 essentially equal to the interior diameter of seating ledge 38. Where the interior diameter of seating surface 36 is approximately 5.188 inches, a securing ring 60 having a cross-sectional width of 0.250 to 0.375 inches, and an outside diameter of approximately 5.198 to 5.210 inches will typically perform satisfactorily. A particular advantage of this embodiment is that the placement of securing ring 60 above the filter bag retaining ring serves to help keep the turbulence in the influent away from the filter bag retaining ring.

Figure 6A:
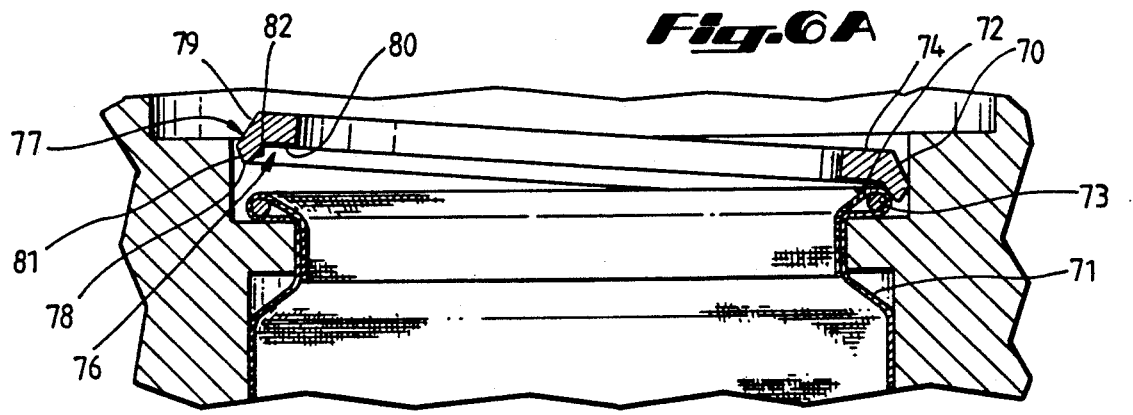
FIGS. 6A-B depict another alternative embodiment of a sealing mechanism in accordance with the present invention in partially installed position (6A) and in operating position (6B), illustrated in vertical section.
Figure 6B:

Referring now to FIG. 6, therein is depicted an alternative form of a securing ring 70 particularly suitable for use as a securing ring for a conventional bag with a self-contained retaining ring. Securing ring 70 includes an internal ledge 72 which provides a somewhat cupped contour to a vertical section of securing ring 70. This contour is particularly suited to seating over a conventional retaining ring in a bag to centralize the retaining ring and to maintain the retaining ring centralized and to therefore secure the retaining ring in an optimal position relative to the receiving member.

Viewed in cross-section, securing ring 70 includes generally parallel top and bottom surfaces 74 and 76, respectively, and a contact surface 77 including converging faces 79 and 81 as described herein with respect to the embodiment of FIGS. 1-3. Bottom surface 76 of retaining ring 70 preferably includes two offset portions 78 and 80 which are parallel to top surface 74 and which are connected by an inclined portion 82. First portion 78 of bottom surface, coupled with inclined portion 82 of bottom surface 74 provide two surfaces which will lie proximate retaining ring 73 through the material of filter bag 71.

In operation, any force exerted on filter bag 71 which would tend to exert a force on retaining ring 73 to deform it and pull filter bag 71 out of position, will result in the application of force on securing ring 70. Any such force will cause securing ring 70 tend to deform and to thereby apply increased force to seating surface 36 of the receiving member, thereby securely retaining securing ring 70 and filter bag 71 in position.

The dimensions of bottom surface portions 78, 80 and 82 may be selected to cooperate with the dimensions of the retaining ring in the filter bag being utilized. The dimensions of bottom surface portions will preferably be selected such that inclined surface 82 will extend proximate the side of retaining ring 73 to prevent substantial lateral movement of ring 73. The dimensions of first portion 78 will preferably be selected to extend substantially fully across the cross-sectional width of retaining ring 73. The exterior diameter of securing ring 70 may be selected as determined with the embodiment of FIG. 4.

In a particularly preferred embodiment, contact ridge 84 of contact surface 77 is located below the horizontal centerline 86 of securing ring 70. This construction enables the ring to be placed in compression through a "cupping," or downward deflection of contact surface 77. Additionally, if the filter bag sealing ring is of a relatively large diameter, securing ring 70 can be inverted, such that the larger face, face 79, will extend proximate the inner diameter of the filter bag retaining ring.

Many modifications and variations may be made in the techniques of structures described and illustrated herein without departing from the scope of the present invention. Accordingly, it should be readily understood that the embodiments described and illustrated herein are illustrative only and are not to be considered as limitations on the present invention.

What is claimed is:

1. A filter apparatus, comprising:
   a housing having a fluid inlet and a fluid outlet;
   a filter basket situated inside said housing;
   a filter bag adjacent said filter basket; and
   a securing apparatus for securing a portion of said filter bag to said filter basket, comprising:
      a receiving member having an inner surface for seating against said filter bag and having a ledge projecting radially inwardly from said inner surface, and
      a securing ring having a generally V-shaped outer circumference, said securing ring having a lower surface adapted to rest against the interior of said filter bag and proximate said ledge, and sized to force its V-shaped outer circumference against said inner surface through said filter bag.

2. The filter apparatus of claim 1, where said inner surface of said receiving member defines a generally cylindrical aperture.

3. The filter apparatus of claim 2, wherein said ledge of said receiving member is generally perpendicular relative to said inner surface.

4. The filter apparatus of claim 1, where said securing ring includes top and bottom surfaces and wherein said generally V-shaped outer circumference of said securing ring is formed by two faces converging from said top and bottom surfaces.

5. The filter apparatus of claim 4, wherein said top and bottom surfaces of said securing ring are generally planar.

6. The filter apparatus of claim 5, where said generally planar top and bottom surfaces of said securing ring are generally parallel to one another.

7. Apparatus for securing a filter bag in a filter apparatus, comprising:
   a curvilinear seating wall against which said filter bag will be secured, said seating wall being generally coaxial with the portion of said filter bag to be secured against said seating wall; and
   a curvilinear securing ring having a generally broad wedge-shaped contact seating surface providing a contact ridge, said securing ring adapted to be compressed when said securing ring is installed within said seating wall wherein said broad wedge-shaped contact surface is at least partially formed by two faces converging at an angle of between 90° to 150°.

8. The apparatus of claim 7, wherein said seating wall is generally circular and wherein said securing ring is generally circular.

9. Apparatus for securing the open end of a bag filter cloth in the inlet end of a bag filter housing, comprising:
   a receiving member adapted to be positioned within the inlet end of a bag filter housing, said receiving member defining a generally circular aperture configured to receive the open end of the bag filter, said receiving member including a seating ledge projecting inwardly from the receiving member into the circular aperture; and a flexible securing ring sufficiently flexible and sized to be inserted within said open end of said bag filter and within said circular aperture and toward said ledge and to seal forcibly along its periphery against the receiving member through said filter cloth, said outer periphery of said securing ring configured to make generally line contact with the receiving member through said filter cloth, wherein said outer sealing surface has the general contour of a shallow-V, oriented along an axis parallel to the radial axis of said securing ring, and wherein the shallow-V contour of said outer sealing surface is formed by two faces which converge to an angle within the range of from 90° to 150°.

* * * * *